United States Patent [19]

Grotenhuis et al.

[11] Patent Number: 5,287,890
[45] Date of Patent: Feb. 22, 1994

[54] DIRECTIONAL GATE VALVE

[75] Inventors: Josef A. Grotenhuis, Nijmegen, Netherlands; Arnold P. Van Mullekom, Horsley Park, Australia

[73] Assignees: Maatschap J. A. Grotenhuis c.s., Nijmegen, Netherlands; De Van Mullekom Family Trust, Horsley Park, Australia

[21] Appl. No.: 944,590

[22] Filed: Sep. 14, 1992

[30] Foreign Application Priority Data

Sep. 18, 1991 [CH] Switzerland ............... 2756/91

[51] Int. Cl.⁵ .............................. F15B 13/04
[52] U.S. Cl. ......................... 137/625.69; 137/625.65; 251/367
[58] Field of Search ........... 137/625.65, 625.69; 251/367

[56] References Cited

U.S. PATENT DOCUMENTS

| | | | |
|---|---|---|---|
| 2,899,939 | 8/1959 | Norris | 137/625.69 |
| 3,215,158 | 11/1965 | Bass et al. | 137/625.69 X |
| 3,255,778 | 6/1966 | Rosebrook | 137/625.69 |
| 3,347,260 | 10/1967 | Lewis et al. | 137/454.6 X |
| 3,370,613 | 2/1968 | Weaver | 137/625.69 |
| 3,477,685 | 11/1969 | Ring | 137/625.69 X |
| 4,838,518 | 6/1989 | Kobayashi et al. | 137/625.65 X |

FOREIGN PATENT DOCUMENTS 1892467 5/1964 Fed. Rep. of Germany .
2136104 12/1972 France .

Primary Examiner—Gerald A. Michalsky
Attorney, Agent, or Firm—Anderson Kill Olick & Oshinsky

[57] ABSTRACT

In the present valve, the valve housing consists parts, namely a block (10) having a through-hole (11) which is preferably conical and a sleeve (20) which fits, with at least the essential part of its lateral surface, tightly and in a self-sealing manner in this hole and contains the cylindrical through-hole for the control piston (35) of the valve and, in its lateral surface, at least one groove (33 and 34) connecting to one another the two windows (27 and 29) furthest away from one another. This design makes it possible on the one hand for the connecting line between the two windows furthest apart to be produced in a substantially simpler manner than in the past. Since the life of a valve is limited by the leakage resulting from the wear between the slide and the longitudinal hole, in the valve according to the invention it is possible on the other hand, after leakage occurs, to replace the sleeve and the slide so that the expensive replacement of the entire valve can be dispensed with, permitting a substantial reduction in the maintenance costs.

6 Claims, 2 Drawing Sheets

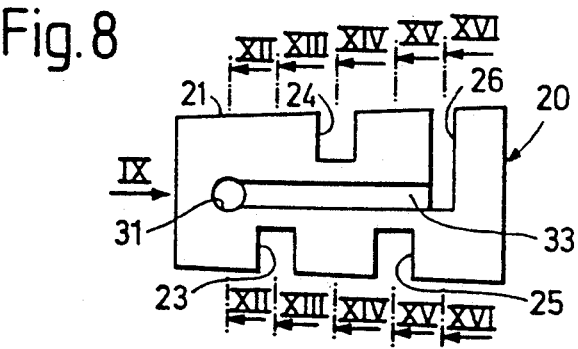
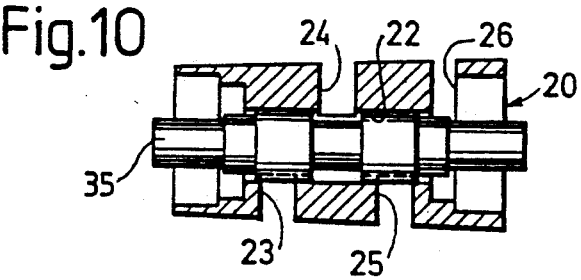
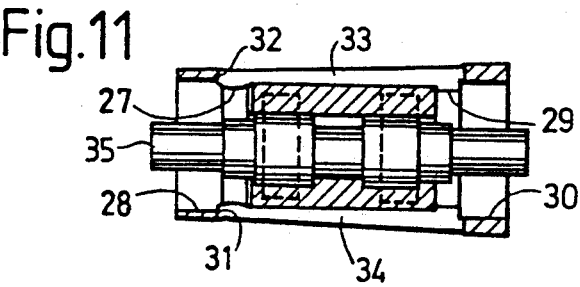
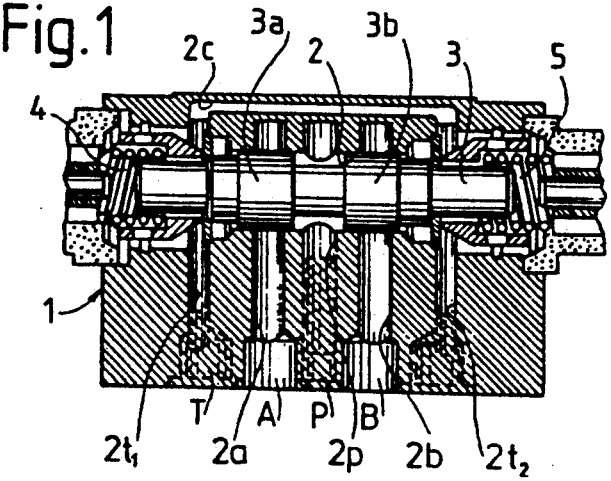
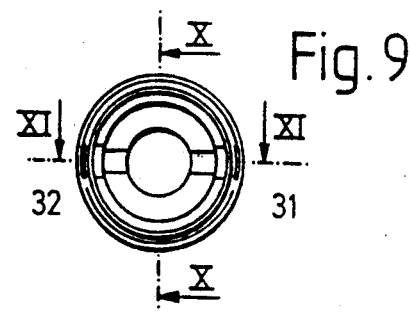
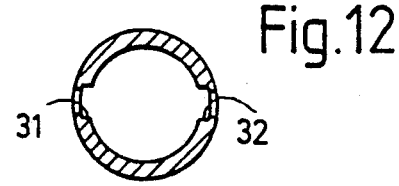
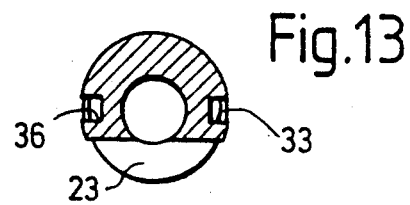
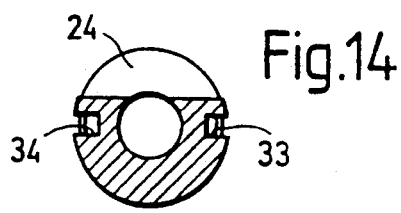
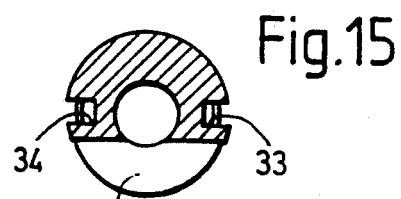
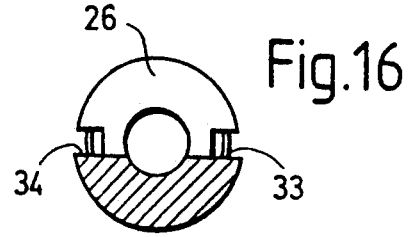

DIRECTIONAL GATE VALVE

DESCRIPTION

A directional gate valve consists essentially of a housing having a through-hole in which a control piston displaceable in the longitudinal direction of the hole fits, the housing being provided with connecting holes for the effective connections, namely for the forward flow and return pipes P and T and the consumer pipes A and B, which connecting holes are arranged transversely with respect to the through-hole and enter the latter. Manual, electromagnetic, hydraulic or pneumatic operating elements serve for displacing the control piston. Such valves are used in countless numbers for liquid and gaseous materials. The quality of such a valve depends on the tolerances with which the control piston fits in the through-hole. The leakage losses depend on the quality of this fit. Owing to the friction caused by the small tolerances and due to small foreign bodies present from time to time in the flow medium, abrasion occurs and results in an increase in the leakage values, and the quality of the valve is thus reduced. If the leakage losses become so large that the function is inadmissibly influenced, the valve is considered defective and must be replaced since this wear cannot be eliminated by repair. The entire valve must therefore be replaced, which is labor-intensive and expensive, labor-intensive because all pipes have to be disconnected from the housing and reconnected tightly to the new housing with the necessary care, and expensive because usually the entire valve, i.e. also the electromagnets used for displacing the control piston in the case of a solenoid valve, has to be replaced, constituting not the essential but an additional cost factor in such a valve.

To avoid disconnection and reconnection of all pipes to the housing, the so-called connection plates are used in practice, a single connection plate for only one valve and a collective connection plate for a plurality of valves. The valve side of such a connection plate is polished and is provided with a pattern of holes corresponding to the nominal size, i.e. a corresponding arrangement of connecting holes. The connecting zones of the valve is likewise polished and provided with O-rings and has the same hole and connection pattern. Most connection patterns are standardized. The valve is fastened to the connecting surface by means of screws. Sealing is effected by means of the O-rings. The effective connections P, T, A and B are arranged in the connection plate. A defective valve can thus be replaced rapidly and simply without disconnecting pipes; the disadvantage that the valve must be replaced with all intact components is, however, not overcome by this constructional measure, which furthermore necessitates the acquisition of a connection plate.

The present invention serves for overcoming all of the above-mentioned disadvantages, i.e. it makes it possible to replace only those parts of a valve which are normally worn and to do so in a simple manner and furthermore without having to provide a valve with a connection plate. This is achieved, in a valve of the type described above, if the housing consists of two parts, namely a block, provided with a through-hole having a circular cross-section and effective connections P, T, A and B tranverse to said throughhole and entering the latter, and a sleeve which is arranged in this through-hole, can be removed therefrom and is provided with five windows coordinated with the effective connections and in which the control piston is mounted in an axially displaceable manner, according to the invention the sleeve fitting, with at least the essential part of its lateral surface, tightly and in a self-sealing manner in the through-hole and having, in its lateral surface, at least one groove connecting to one another the two windows furthest away from one another. It is particularly advantageous if the through-hole is conical and the sleeve has a lateral surface of the same conicity, which is between 1° and 4°, preferably between 1.5° and 2.5°.

Two-part housings are known in principle, one having a conical sleeve in the French Patent No. 2,136,104 and one having a cylindrical sleeve from the German Utility Model No. 1,892,467. In both cases, however, the sleeves are provided with O-rings between the windows. In such a design, however, it is not possible to connect the two windows furthest away from one another by a groove arranged in the sleeve. The arrangement of this connecting groove which can be produced by milling in the sleeve makes it possible to dispense with the production of a connecting pipe by the casting method, it being possible to use not only cast housings which are simple to prepare but also housings which are produced from rolled material and therefore have a substantially greater strength or, in the case of a strength which is not higher, substantially smaller dimensions.

A 4/3-way gate valve according to the invention is described below with reference to the attached drawings, as an embodiment. In the drawings, FIG. 1 shows the principle of a 4/3-way gate valve, FIG. 2-7 shows the block of the novel valve, namely FIG. 2 shows a front view in the direction of the through-hole, i.e. in the direction of the arrow II of FIG. 3, FIG. 3 shows a side view in the direction of the arrow III of FIG. 2, FIG. 4 shows a section along the line IV—IV of FIG. 3, FIG. 5 shows a section along the line V—V of FIG. 3, FIG. 6 shows a section along the line VI—VI of FIG. 3 and FIG. 7 shows a section along the line VII—VII of FIG. 3;

FIG. 8-16 show the sleeve of the novel valve, i.e.

FIG. 8 shows a side view,

FIG. 9 shows a front view in the direction of the arrow IX in FIG. 8,

FIG. 10 shows a section along the line X—X of FIG. 9 but with an inserted control piston, FIG. 11 shows a section along the line XI—XI of FIG. 9, likewise with inserted control piston, FIG. 12-16 show sections through FIG. 8, i.e.

Figure 2:
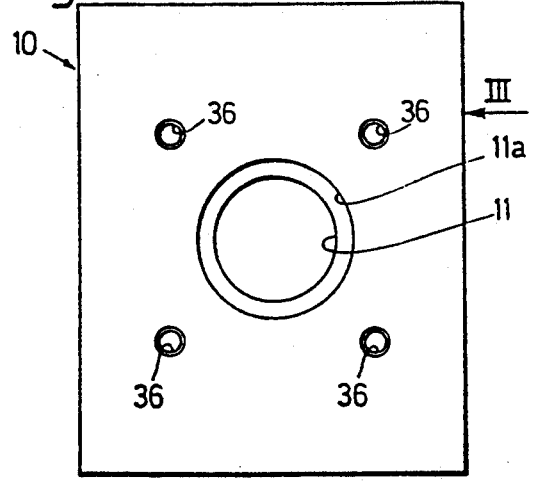
Figure 3:
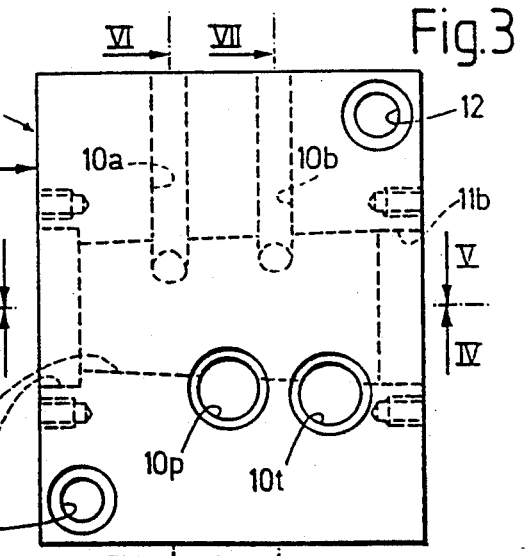
Figure 4:
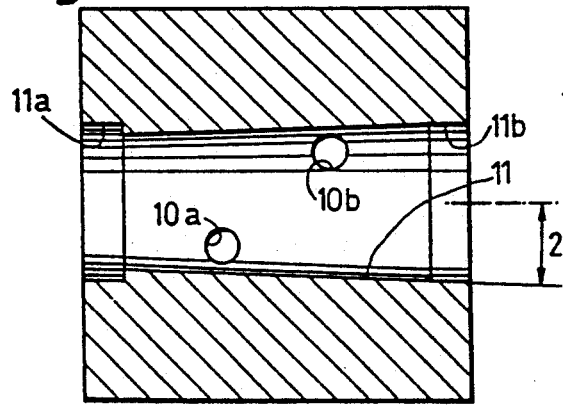
Figure 5:
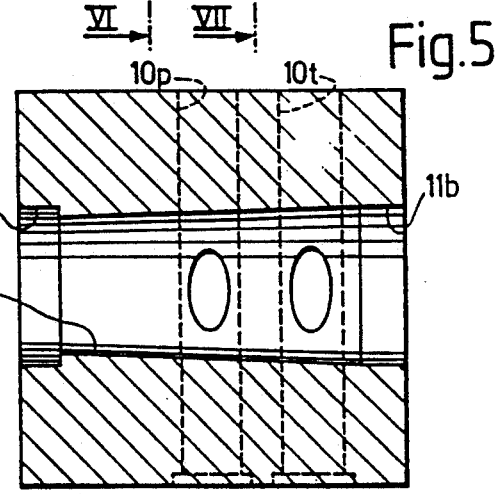
Figure 6:
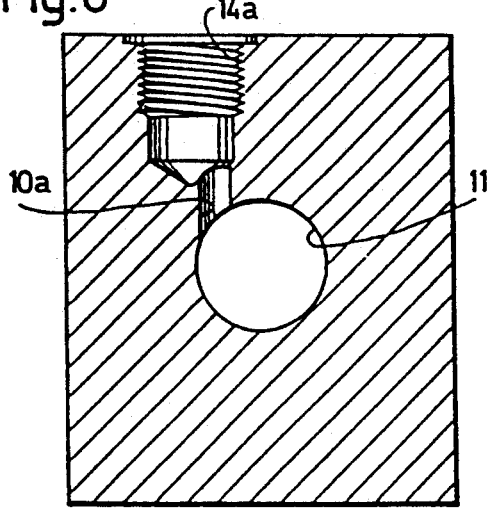
Figure 7:
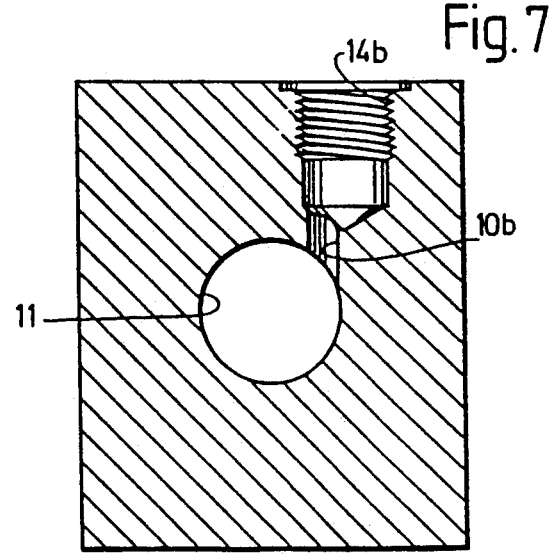

FIG. 12 along the line XII—XII,
FIG. 13 along the line XIII—XIII,
FIG. 14 along the line XIV—XIV,
FIG. 15 along the line XV—XV and
FIG. 16 along the line XVI—XVI.

As can be seen from the schematic drawing of a 4/3-way gate valve shown in FIG. 1, i.e. of a gate valve having four effective connections and three positions, the housing 1 has a through-hole 2 in which a control piston or slide 3 displaceable in its longitudinal direction is arranged. The four transverse holes, the hole $2p$ with the connection P for connecting the pressure pipe, the two holes $2t_1$ and $2t_2$ connected to one another by the pipe 2c, one of which is provided with the mouth T connecting the return flow pipe, and the holes 2a and 2b with the connections A and B, respectively, for connecting the working pipes enter the through-hole.

The control piston 3 is a piston which is held by the two springs 4 and 5 in the middle position shown and in which its two thick sections 3a and 3b each block one of the two holes 2a and 2b. As a result, the part between the hole 2p and the holes 2t is of course also blocked.

If any force, for example exerted by an electromagnet which is not shown, pushes the control piston 3 slightly to the left against the force of spring 4, the pipe 2p is connected to the pipe 2a and the pipe 2b to the pipe $2t_2$. Consequently, the pressure medium can flow from connection P to the connection A connected to the entry pipe of the consumer, and from the connection B connected to the outflow pipe of the consumer, via the connecting pipe 2c to the mouth T, to which a return flow pipe, for example leading to the reservoir, is connected. If, however, the control piston 3 is moved to the right against the force of the spring 5, the pipe 2p is connected to the pipe 2b and the pipe 2a to the pipe $2t_1$. Consequently, the pressure medium can flow from connection P to connection B, from there through the consumer which is now shown, but in the opposite direction of flow to the other control piston position, i.e. from connection B to connection A, and from there to connection T.

As is clearly evident, the to-and-fro movement of the control piston 3 results, in the longitudinal hole 2, in abrasion which causes a reduction in the piston diameter and an expansion of the hole until the piston no longer fits tightly in the hole. The valve has then reached the end of its service life and must be replaced.

To avoid having to replace the entire valve and therefore in particular also to avoid disconnecting the connecting pipes from the connections P, T, A and B and connecting them tightly again, in the valve according to the invention the housing consists of two parts, namely a block and a sleeve fitting into it. These two parts are shown in the drawing and are described below.

The block designated as a whole by 10 has a conical longitudinal hole 11, apart from two short, cylindrical sections 11a and 11b. The generating lines of this conical hole make an angle of 1°-4°, preferably of 1¼°-2¼°, for example of 2°, with the axis of the hole. Two stepped holes 12 and 13 serve to connect a plurality of valve housings with the same dimensions to one another by means of screws to form a stable column. Two holes 10p and 10t which are parallel to these holes serving for fastening and which are likewise through-holes intersect the conical hole 11. They serve as risers; the hole 10p corresponds to the hole 2p shown in the schematic diagram, i.e. serves for supplying the pressure medium, while the hole 10t corresponds to the hole 2t and serves as a return pipe for the pressure medium. A groove at the end of each hole serves for the insertion of a packing ring, as is usual and known in the case of valves mounted adjacent to one another.

The two holes 10a and 10b which correspond to the holes 2a and 2b, respectively, of FIG. 1 and pass over outward into the threaded holes 14a and 14b, respectively, also enter the conical longitudinal hole 11. These connecting holes serve for connecting the valve to a consumer via a forward flow pipe and a return pipe.

The second part of the valve housing is formed by the sleeve shown in FIG. 8 to 16 and designated as a whole by 20. This sleeve has on the outside a conical lateral surface 21, which fits exactly into the conical hole of the block 10, and on the inside a cylindrical hole 22. The sleeve 20 is provided with four radial incisions 23, 24, 25 and 26. These incisions are arranged so that their central planes pass through the axes of the holes 10a, 10p, 10b and 10t described above when the sleeve 20 fits tightly into the hole 11 of the block 10. The hole 22 expands in two steps at each end, which steps are designated by 27 and 28 at the thinner end and by 29 and 30 a the thicker end.

In section 27, the sleeve has two transverse holes 31 and 32 which are connected to the radial incision 26 via a groove 33 or 34, respectively, made in the conical lateral surface.

As shown in FIG. 10, the slide or piston 35 is displaceably mounted in the hole 22 and has the same form as the slide 3 described with reference to FIG. 1, making it not only unnecessary to give a detailed description of the slide but also unnecessary to describe the function of the valve again.

However, two essential advantages are important and should therefore be noted. One relates to maintenance and the other to production:

As can be clearly seen, the sleeve 20 which fits in block 10, is held there by an end cover not shown, known per se and fastened by screws screwed into screw holes 36 and thus forms the valve housing together with the block can be removed after removal of this cover and changed together with the slide 35 as soon as one of these two parts exhibits inadmissible extensive wear. This replacement is on the one hand substantially more advantageous than the replacement of the entire valve from the point of view of the price of the spare parts. On the other hand, the work required for replacement of the defective parts is substantially less in comparison with the replacement of valves not provided with connection plates, since it is no longer necessary to disconnect the connecting pipes from the valve housing and to attach them again tightly to the new housing, which in fact is usually not possible without additional replacement of parts damaged during dismantling. However, if the leaking valve part is one of a valve group formed by a plurality of valves connected to one another, it was previously necessary to remove the valve to be replaced, which is connected tightly to the other valves by means of screws passing through the holes 12 and 13, from the group after disconnecting the entire assembly and to replace it with a new valve and thereafter to connect the entire group tightly together again. This last-mentioned disadvantage could be avoided up to now only by using the connection plate, with the result that the effort involved in replacing the valves with worn parts could be reduced at the expense of a correspondingly higher procurement price. Since in the case of the new valve it is in any case possible to replace only the parts which have started to leak as a result of wear, i.e. no longer the entire valve housing, it is possible to dispense with the use of connection plates.

A not insignificant simplification is also achieved in the production of the valve by virtue of the fact that the connecting channel which is designated by 2c in FIG. 1 and whose production is possible only by casting and whose rough cast skin cannot be processed mechanically to give a surface having better smoothness is formed in the valve according to the invention by one or two grooves 32 and 34 in the surface 21 of the sleeve 20, which grooves are extremely simple to produce.

As already mentioned above, the block 10 of a valve according to the invention may also be produced from a rolled material, for example from high-strength alloyed steel. The use of such a material makes it possible to use valves of conventional dimensions for a much higher nominal pressure than in the past.

Although a valve having a conical hole is described above as an embodiment of the invention, it is also possible to make the hole and the outer surface of the sleeve cylindrical. However, the hermetic seal is not possible in such an embodiment. If the same, essentially negligible leakage loss as between sleeve and piston is acceptable between block and sleeve, it is possible to use valves which have a cylindrical hole and can be produced more economically than those having a conical hole.

What is calimed is:

1. A directional gate valve which can be used as a control element and consists of a housing and a control piston and in which the housing is formed from two parts, namely a block (10), provided with a through-hole having a circular cross-section and effective connections P, T, A and B transverse to said through-hole and entering the latter, and an integral one-piece sleeve (20) arranged in a conical through-hole (11), removable therefrom and provided with five windows coordinated with effective connections, the control piston (35) being mounted in an axially displaceable manner, wherein the sleeve (20) fits, with at least the essential part of its lateral surface, tightly and in a self-sealing manner in the through-hole (11) and has, in its lateral surface, at least one groove (33, 34) connecting to one another two windows furthest away from one another and the generating lines of the through-hole make an angle of 1° to 4° with the axis, the sleeve has two transverse holes ((31) and (32)) which are connected to a radial incision (26) via grooves ((33) or (34)), made in the conical lateral surface.

2. A directional gate valve as claimed in claim 1, wherein the generating lines of the through-hole make an angle of 1.5° to 2.5° with the axis.

3. A directional gate valve as claimed in claim 1, wherein the block (10) consists of high-strength alloyed steel.

4. A directional gate valve as claimed in claim 1, wherein the block (10) is a right parallelepiped, wherein the axis of the through-hole is at right angles to a pair of surfaces and wherein two parallel flow pipes (10p, 10t) which intersect the through-hole, form the effective connections P and T with their ends and are at right angles to one of the other pairs of surfaces are present.

5. A directional gate valve as claimed in claim 4, wherein the two flow pipes (10p, 10t) have an extension for receiving a packing ring, at least at one end.

6. A directional gate valve as claimed in claim 4 or 5, wherein the block (10) has at least two continuous orifices (12, 13), parallel to the flow pipes, for receiving connecting means with which a valve can be connected to an adjacent valve so that the flow pipes (10p, 10t) are connected to one another.

* * * * *